MULTIPLE POWER PULSE GENERATION

Filed Aug. 15, 1966

INVENTOR.
Howard L. Kennedy
BY Mueller, Aichele & Rauner
ATTY'S.

United States Patent Office 3,479,532
Patented Nov. 18, 1969

3,479,532

MULTIPLE POWER PULSE GENERATION

Howard L. Kennedy, Phoenix, Ariz., assignor to Motorola, Inc., Franklin Park, Ill., a corporation of Illinois Filed Aug. 15, 1966, Ser. No. 572,332
Int. Cl. H03k 5/159
U.S. Cl. 307—260 8 Claims

ABSTRACT OF THE DISCLOSURE

A generator for providing a sequence of pulses in response to a single actuating pulse is disclosed. The generator utilizes a number of series combinations of delay lines and saturable reactors with the saturable reactors controlling the discharge times of the corresponding delay lines. Thus, the resultant pulse sequence can be substantially shorter in duration than the switching time of the single actuating means.

This invention relates to the generation of a sequence of pulses from a single actuating input pulse, and more particularly to those generators using distributed capacitive-inductive delay lines in combination with saturable reactors for forming and spacing high frequency high power pulses.

Several types of electronic systems require high power pulses at a high pulse repetitive frequency. Such applications include pulse generators for radar modulation, impulse testing, and auxiliary and ancillary circuits such as initiators and submodulators for powerful electronic discharge devices, such as ignition circuits.

Thermionic vacuum tubes have been used to construct such multiple pulse generators. Such generators are subject to the problems of vacuum tube systems. They further require quite high plate voltages in order to reduce power loss caused by the high "on" peaks of the vacuum tube and require large filament power to heat the cathode. Vacuum tubes have been used with distributed lines having inductive and capacitive characteristics to produce a single pulse for applications, such as radar modulation.

It is desired to provide a multiple pulse generator using only solid state components. Presently, power transistors have marginal switching speeds, low current gains, and collector voltage ratings up to 100 volts with a peak current of 30 amps. Such characteristics limit a single transistor to the generation of a power pulse having peak power of 2,000 watts.

Silicon controlled rectifiers are currently available with an 800 volt and 100 ampere peak rating. Silicon controlled rectifiers are, however, not satisfactory for providing high frequency, high power pulses because once the silicon controlled rectifier is conducting it is quite difficult and slow to stop such conduction for quickly producing a second pulse.

It is, therefore, an object of this invention to provide a solid state multiple pulse generator capable of producing high power, high frequency pulses.

It is another object of this invention to provide a high power, high frequency pulse generator using a unitary control device that operates at a lower pulse repetitive frequency than the output pulses.

It is a further object of this invention to provide a multiple pulse generator having selective pulse spacing and pulse duration and capable of being operated as a pulse position modulator.

It is a further object of this invention to provide a high power, high frequency multiple pulse generator using only a single active semiconductor control element which is capable of operating at a repetition rate substantially less than that of the output pulses.

This invention includes the feature of storing energy for forming pulses in capacitive portions of delay lines and selectively discharging such stored energy rapidly through an electronic switch to a load for forming a pulse. A plurality of such delay lines are selectively isolated by saturable reactors which are switched between remanent magnetic states for forming a succession of high frequency, high power pulses. The electronic switch, for example, may take the form of a semiconductor silicon controlled rectifier or a thyration-type of gaseous discharge tube.

Figure 1:
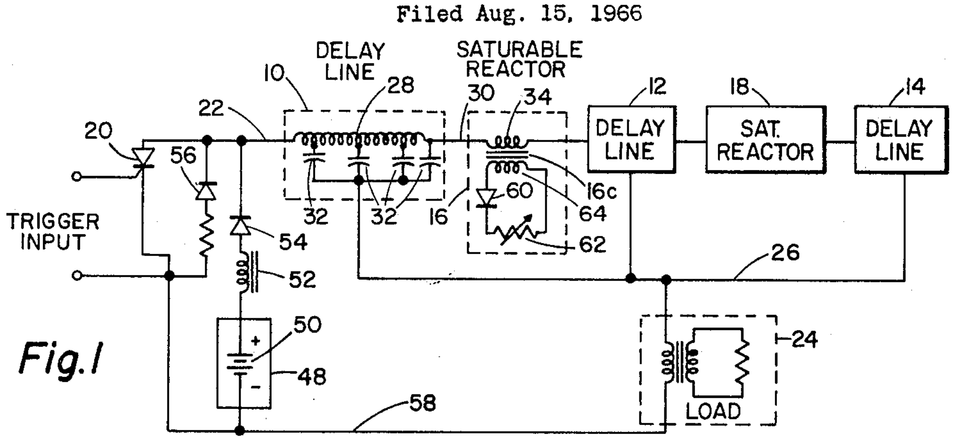
FIG. 1 is a schematic diagram illustrating the invention wherein a plurality of delay lines are in a series circuit connection with a plurality of discharge controlling saturable reactors.

In practicing the subject invention inductive-capacitive delay lines, in series circuit connection with a plurality of saturable reactors, are first charged for storing electrical energy in their respective capacitances. In charging the lines the series connected saturable reactors are switched to a first remanent magnetic state. The series circuit connection consists of a delay line connected to a first saturable reactor which in turn is connected to another delay line as above described, etc., forming a series circuit of alternate lines and reactors. One end of the circuit is connected to a switch, such as a silicon controlled rectifier, which is connected to one end of a load. The load other end is connected to the capacitive portions of the delay lines for completing a discharge circuit for the line capacitances.

In forming pulses the silicon controlled rectifier is first switched to a current conduction state and is then held there while all the pulses are being formed. The delay line closest to the switch first rapidly discharges therethrough to form a first pulse in the load, the characteristics of which are determined by the electrical characteristics of such line. Upon completion of this rapid discharge the first connected saturable reactor begins to pass current from the second line (which is still charged) to the first line. The saturable reactor is selected such that its magnetic saturation is produced by a relatively small current magnitude with respect to the desired output pulse amplitude. Upon having its magnetization reversed the saturable reactor presents an extremely low impedance to the second line which then rapidly discharges to provide a second pulse through such saturable reactor, the first line, switch, and into the load. Each such reactor-delay line combination becomes a series circuit. Additional series circuits of such reactors and lines operate in the above described manner and series connected together operate to form a sequence of high power, high frequency pulses.

The pulse formation may be selectively altered by operating the saturable reactor such that it is not subjected to the full swing through its hysteresis characteristic or by altering the propagation time of the various delay lines.

In practicing the subject invention according to another embodiment, various delay lines are series connected to a saturable reactor. Each reactor-delay line pair forms a series circuit which is connected in parallel circuit with respect to all other pairs. Each saturable reactor must have a different volt second characteristic such that they will respectively switch magnetization states at different times to form pulses from their respective connected lines at differing times to create a sequence of high power, high frequency pulses.

The other embodiment may be modified by connecting an additional delay line in parallel to the above described reactor line and providing semiconductor diode isolation therefor. The intervening diode provides a series resistance which decreases the efficiency of the additional line. Where extremely high power is required, such series resistance may be undesirable.

The invention may be further practiced in alternate ways by using a combination of parallel and series connections of series circuits of reactors and delay lines.

Referring now to FIG. 1 there is shown a plurality of delay lines 10, 12 and 14 each having distributed inductance and capacitance for storing electrical energy. Saturable reactors 16 and 18 are electrically interposed between adjacent lines for controlling the time of discharge of the succeeding delay line; i.e., reactor 16 controls line 12 and reactor 18 controls line 14 discharge. The pulse sequence is initiated by switch 20, which may be a silicon controlled rectifier. Rectifier 20 is connected to terminal 22 of line 10 for coupling the series connection 10, 16, 12, 18, 14 to load 24, which may be a magnetron or other type of radar modulator. The capacitance discharge path is completed by line 26 which commonly connects the capacitance portion of the lines 10, 12 and 14 to load 24.

Assume that all the delay lines have been charged to voltage V for forming a sequence of pulses. The electrical condition of the circuit is that switch 20 is nonconductive for holding the electrical energy in the lines. Each line is constructed substantially identical with only line 10 being illustrated in detail. Line 10 consists of an inductance 28 connected in series circuit relationship between delay line 10 terminals 22 and 30. A plurality of capacitors 32 are connected in parallel circuit between various points on inductance 28 and common line 26. The use of such a line 10 to form a single pulse is described by Terman in "Radio Engineering," third edition, McGraw-Hill, p. 787, especially see FIGURES 16–3(*a*).

Once switch 20 is driven into its current conduction state line 10 rapidly discharges therethrough to form a first appearing pulse in load 24 in a manner similar to that described by Terman, supra.

Clamp diode 56 is added to clamp out negative-going pulse overshoots to prevent them from influencing the voltage to which the networks are recharged.

Figure 2:
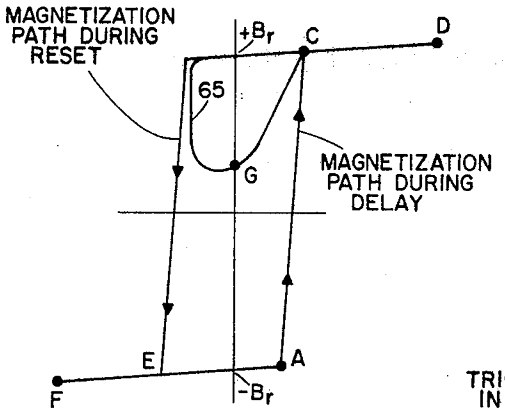
FIG. 2 is a graphical representation of a hysteresis characteristic of a saturable reactor having a rectangular hysteresis characteristic.

Before continuing the system description, an explanation of how saturable reactor 16 operates as a switch is appropriate. Referring to FIG. 2 there is shown an idealized rectangular hysteresis loop for saturable reactor 16 core **16*c*. The following description is equally applicable to other saturable reactors. When lines 10, 12, 14 are being charged for storing energy the charging current through winding 34 forces the magnetization state of saturable core 16*c* to point F on the curve. When lines 12 and 14** capacitances have been fully charged, current stops flowing permitting the magnetization to relaxe to the zero ordinate at point, $-B_r$, a first remenant magnetic state.

The charging current in winding 34 is applied at a relatively slow rate and flows from terminal 30 toward line 12; as such the impedance of reactor 16 in winding 30 is small (eventually becoming saturated) for such current but presents a high inductive impedance to reverse flowing current resulting from a step reduction in voltage at terminal 30. This high impedance blocks line 12 during line 10's discharge.

At this time the voltage on line 12 causes a slow buildup of current through the high inductance of reactor 16. Consequently the magnetic state of reactor 16 moves from $-B_r$ around the knee, A, of the hysteresis curve toward C. The inductance of reactor 16 is proportional to the slope of the hysteresis curve; therefore, its inductance remains very high between points A and C. The impedance of line 12 is much lower than the impedance of the reactor whenever its magnetic state is between points A and C. The rate of rise of the magnetizing current through the reactor will be nearly a linear function of time. When the magnetizing current reaches a sufficient magnitude, point C on the hysteresis curve is reached. At this time, there is an abrupt decrease in the inductance of the reactor resulting in a sudden decrease in its impedance. This switching action allows line 12 to discharge at a high rate and current level through the low winding resistance of the reactor forcing its core, **16*c*, into a high degree of saturation, point D. Following the pulse discharge core 16*c* is left in its remanent $+B_r$ state until the formation of the next pulse, formed by the delayed discharge of delay line 14, when it is again magnetized to D from $+B_r$. Therefore, reactor 16 by temporarily blocking line 12** current acts as a switch, delaying its discharge; a switch which once closed will remain in the closed position until reset by a current reversal.

Figure 1A:
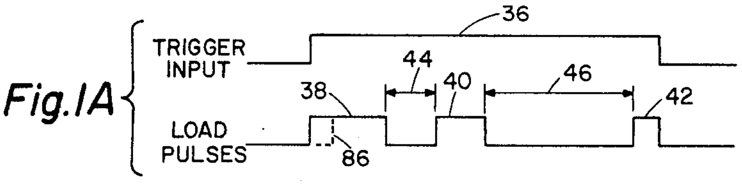
FIG. 1A illustrates two idealized waveforms used in the explanation of the circuit operation of FIG. 1.

Returning now to the description of the pulse forming generator, with particular reference to FIG. 1A there is shown the trigger input to switch 20 which consists of wave or pulse 36 having a duration equal to the total time required to form pulses 38, 40 and 42 respectively from lines 10, 12 and 14. Load pulse 38 is the pulse formed by the described discharge of line 10 capacitors 32. Time delay 44 between the trailing edge of pulse 38 and the leading edge of pulse 40 is provided by the volt-second characteristic of reactor 16, which is represented by the switching action of the reactor as described with respect to FIG. 2.

Line 12 formed pulse 40 is provided through reactor 16, line 10 and switch 20 to load 24. The characteristics of pulse 40 are determined by the electrical length of line 12, the longer the electrical length the longer the pulse duration. Pulse 40 is shown as having different duration from pulse 38 (line 10) for illustrating that the line lengths are different and as such can be used to provide different pulse durations in the same burst of pulses; however, the characteristic impedance of the lines should be the same.

When reactor 16 switches into its second saturated state, it connects line 12 in series with line 10. The discharge current from line 12 is coupled through reactor 16, line 10, semiconductor switch 20 through the load and then back to the common bus of line 12. By requiring the delay lines to have the same characteristic impedance, the pulse formed by line 12 will experience minimum of distortion and power loss in being propagated through line 10. Because it first passes through line 10, before appearing at the load, the pulse will be delayed by an additional time equal to the normal propagation time of line 10 as well as the magnetic switching time of reactor 18. However, the voltage to which line 12 is charged will first appear across reactor 16 at a time relative to the leading edge of the first pulse, equal to the one way propagation time of line 10. Therefore, pulse 40 leading edge occurs at the load two times the propagation time of line 10 plus the magnetic switching time of reactor 16. This makes space 44 equal to the magnetic switching time of reactor 16. In a practical case, each line and reactor that a pulse must propagate through will introduce some degree of distortion and attenuation, thus the number of reactor-delay line combination which may be cascaded is limited and dependent on a particular design.

Reactor 18 operates in the same manner as previously described for reactor 16, such as to discharge line 14 through a circuit consisting of reactor 18, line 12, reactor 16, line 10 and switch 20 to provide a pulse 42 in load 24. The pulse spacing 46 between pulses 40 and 42 is determined by the volt-second characteristic of reactor 18.

Since reactor 16 is already in a magnetic saturation state permitting the flow of current therethrough from line 12, it also provides a low impedance to line 14 supplied current. Therefore, it can be said that reactor 16 and line 12 form one pulse forming circuit while reactor 18 and line 14 form another.

Upon the cessation of pulse 42, switch 20 is returned to current cutoff. Lines 10, 12, 14 are then recharged and saturable reactors 16 and 18 are reset to the first magnetic state in preparation for forming another sequence of pulses identical to 38, 40 and 42.

To charge the lines 10, 12 and 14 energy source 48 such as a battery 50, provides an electrical current through charging choke 52 and diode 54 to terminal 22 of line 10. Clamping diode 56 is reversed biased to current cutoff. The charging current flows in the only open path through terminal 22 into line 10 to charge capacitors 32. The line 10 charging circuit is completed by line 26 and load 24 being connected over line 58 to the return side of energy source 48.

The charging current at terminal 30 is opposed by the high inductance of reactor 16. It will be remembered that reactor 16 was switched to its positive or second magnetization state during multiple pulse formation. That is, after switch 20 was opened (current cutoff) and lines 12 and 14 had been discharged, no further current flows through winding 34 permitting the reactor core **16*c* to return to its point of remanent magnetization, $+B_r$. Delay line 12 receives insubstantial current until the voltage charge on capacitors 32 reach a value such that the charging current magnitude from terminal 30 through winding 34 switches the magnetization of reactor 16 to point E (FIGURE 2). Upon reaching point E reactor 16 magnetization will have been switched into its first saturated magnetic state resulting in a rapidly increasing current through winding 34 flowing from terminal 30. The increased current forces the magnetization of reactor 16 to point F, negative magnetic saturation. Line 12 is then charged by current through reactor 16 and line 10. The capacitors 32 of the line 10 will also continue to charge until full voltage is obtained. Reactor 18 and line 12 are respectively reset and charged in the manner described for reactor 16 and line 12 making the pulse generator ready to provide a subsequent sequence of pulses. Because the rate normally used to recharge the lines is much slower than the rate required for properly discharging the lines, reactors 16 and 18** are usually reset before their preceding lines have been fully charged.

Having described a complete cycle of operation for the FIG. 1 embodiment, a description of certain modifications which may be made thereto now follows. Time space 44 between first pulse 38 and subsequent pulse 40 may be varied by altering the resetting of saturable reactor 16 and thus altering its first magnetic state. A diode 60 and variable resistor 62 are connected in series circuit with an additional winding 64 on reactor core **16*c*. The windings 34 and 64 are mutually coupled such that a voltage induced in winding 64 during formation of the multiple pulses, i.e., discharge of line 12, will reverse bias the diode 60 such that insignificant energy will be taken from winding 34. However, while charging the network the induced voltage of winding 64 will forward bias the diode 60 into current conduction. The current flowing in winding 64 produces a magnetic field opposing the remanent magnetization of core 16*c* and has the same effect as shunting a portion of the reset current through a parallel impedance. In fact if isolation from the DC voltage on the delay lines is not required, the resistor and diode may be placed directly in parallel with winding 34, in which case winding 64 is not required. Then by varying the value of resistor 62, the degree to which core 16*c* is reset may be adjusted. One such setting is illustrated by line 65** in FIG. 2. Upon cessation of charging the core will relax to point G which is a partially saturated first magnetic state.

The effect of a partially reset reactor 16 on the formation of multiple pulses will be to substantially reduce the spacing 44. The reactor core **16*c* being reset to point G will return to positive magnetic saturation much more easily and quickly than if the core had been reset to negative remanent magnetization. This is true because a smaller change in flux density is required to reach saturation. By making impedance 62 equal to zero, the reactor 16 will remain substantially at remanent magnetization, $+B_r$. In the latter case as soon as line 10 starts to discharge, insignificant impedance is provided by reactor 16 to line 12 supplied current. Such a condition permits the lines 10 and 12 to both discharge immediately upon conduction of switch 20. Such action will form a single prolonged pulse approximately equal to the width of pulse 38 plus pulse 40. Pulse 42 formed by line 14 occurs at time space 46 after prolonged pulse 38, to provide two pulses in sequence rather than three. The total elapsed time for forming the multiple pulses is also reduced. It is to be appreciated that reactor 18 can be adjusted in the same manner as reactor 16** to provide additional variation between successive pulses if multiple generated pulses to selectively provide combinations of pulse-widths and pulse-times. Such variations provide a wide range of pulse modulation possibilities. For example, this type of variation could also be made by a bias current, fixed for a fixed position of the pulse or time varying if pulse position modulation is desired.

Figure 3:
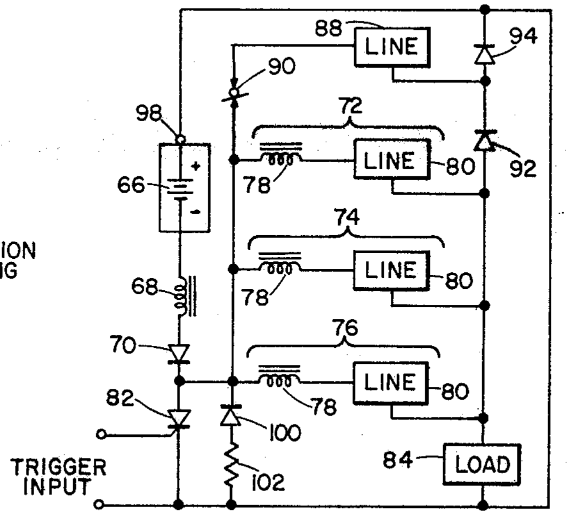
FIG. 3 illustrates another embodiment of the invention wherein all the delay lines storing pulse forming energy are in parallel relationship with respect to each other.

FIG. 3 illustrates another embodiment wherein the lines containing charged electrical energy in series with a saturable reactor forms series circuits which are connected in parallel for forming multiple pulses. Energy source 66 provides charging current through charging choke 68 and diode 70 to the series circuits 72, 74 and 76 in the manner as described for reactor 16 and delay line 12. The saturable reactors are indicated in FIG. 3 by coils 78 while delay lines are indicated by the rectangles 80. A trigger input pulse 36 is applied to semiconductor switch 82 driving it into current conduction saturation as described for switch 20 in FIG. 1. The series circuits 72, 74, 76 then selectively rapidly discharge their stored electrical energy to switch 82 and load 84 forming a succession of pulses 38, 40, 42 (FIG. 1*a*). The volt-second characteristic of the saturable reactors 78 in the various series circuits 72–76 are chosen to be sufficiently different to provide delayed switching time, one with respect to the other, for providing a succession of pulses. Assume that series circuit 72 provides first occurring pulse 38. Saturable reactor 78 in circuit 72 then has a volt-second characteristic no less than the volt-second characteristics of all pulses generated thereafter. Assuming that circuit 74 provides the second occurring pulse 40, its saturable reactor 78 has a similar volt-second characteristic with respect to all its succeeding pulses.

The reasons for requiring the above-mentioned volt-second characteristic will now be explained. Assume that circuit 72 has switched its saturable reactor to the negative remanent magnetic state, $-B_r$ (FIG. 2) and line 80 thereof has discharged. The circuit 74 reactor 78 then is switched to positive magnetic saturation and the circuit 74 (line 80) discharges therethrough providing a second pulse to load 84. There are no isolating diodes in the loop formed by circuit 74 being in parallel with circuit 72. If the circuit 72 has an impedance comparable to the load 84 impedance, then a portion of the current pulse provided by circuit 74 will be diverted from load 84 and circulate through the loop formed by circuits 72 and 74 in a direction for discharging circuit 74 and charging circuit 72. Therefore, if the circuit 72 saturable reactor 78 has a volt-second characteristic such that it will not switch from its positive remanent magnetization to its negative magnetic saturation due to the pulses from circuits 74 and 76 it will effectively block all such pulses from entering circuit 72. Circuit 74 operates in the same manner with respect to circuit 76.

By adjusting the switching of the various saturable reactors 78 it can be seen that the pulse spaces 44 and 46 between the three pulses 38, 40 and 42, may be varied. Therefore, the same combinations of pulses may be formed by the FIG. 3 circuit as that formed by the FIG. 1 circuit. It must be remembered that in the FIG. 3 embodiment, the saturable reactors 78 must be chosen to have certain volt-second characteristics, which are not required for the FIG. 1 circuit.

In the FIG. 3 embodiment pulse 38 will be delayed from the wave front of trigger input pulse 36 as indicated by dotted lines 86 in FIG. 1A. As shown, the FIG. 3 provided pulse is also of shorter duration (for illustrative purposes).

If it is desired to have the first pulse coincide with the wave front of the trigger input pulse 36, then the circuit 72 saturable reactor 78 is inhibited from switching to negative magnetic remanence as described for FIG. 1.

A further modification consists of adding a circuit including line 88 having a terminal 90 connected to switch 82 in parallel with the series circuits 72, 74 and 76. The capacitor terminal of line 88 is connected to an isolation diode 92 to load 84. Line 88 will immediately discharge upon switch 82 becoming conductive.

When circuits 72, 74 and 76 are subsequently providing pulses to load 84, diode 92 stops the circuits 72, 74 and 76 supplied currents from flowing through terminal 90 into line 88. When line 88 is discharging to form its pulse, diode 92 is forward biased permitting current flow through a circuit including line 88, terminal 90, switch 82, load 84 and diode 92.

To charge line 88 for providing a rapid discharge formed pulse, diode 94 is connected between the capacitor terminal 96 of line 88 to the return terminal 98 of energy source 66. The configuration including line 88 is not preferred because of a series resistance introduced by the diode 92.

Clamping diode 100 with series resistor 102 may be added across the switch 82 for limited core reset action similar to that described for the FIG. 1 circuit.

What is claimed is:

1. The combination of claim 7 wherein two series circuits operate such that when one series circuit completes providing its pulse another series circuit initiates the provision of its pulse whereby said two provided pulses combine to form a single pulse in the load.

2. The combination of claim 7 wherein said parallel series circuit have an additional delay line having capacitance for storing electrical energy and connected in parallel thereacross, a diode electrically interposed between said additional line and one end of said parallel circuits and poled to block currents flowing from said parallel circuits during pulse formation, and additional means connected to said line for charging the additional line capacitance therein independent of said parallel connected series circuits.

3. The combination of claim 8 wherein the reactor includes means for adjusting its magnetic states whereby spacing between successive pulses may be selectively varied to provide pulse position modulation.

4. The combination of claim 8 wherein the switch means is a silicon controlled rectifier.

5. A solid state multiple pulse generator, including in combination:

two delay lines each including capacitance for storing electrical energy and having two delay terminals with a current path therebetween and a capacitance connection terminal, a switchable saturable reactor including a core of magnetic material exhibiting rectangular hysteresis characteristics and being capable of assuming two stable magnetic states, and including winding means for switching the magnetic state of the core in response to a received current, said reactor winding means being electrically connected to a delay terminal of each delay line such as to form a series connection consisting of the two delay lines and saturable reactor winding means forming a current path therethrough and leaving an unconnected delay terminal at each end of said series connection, means for forming a common connection and being connected to the capacitance terminals of said delay lines, line charging means connected across said common connection and one of the unconnected delay terminals for charging the capacitance of both lines and selectively switching the reactor to a first stable magnetic state, solid state switching means for selectively forming a current path from said one delay terminal and the common connection for diverting charging current from the one delay terminal such that the capacitance stored energy in said lines is discharged through said switch means, the combination being such that as the delay lines capacitance discharge the saturable reactor switches to an opposite stable magnetic state for successively permitting the delay lines to discharge through the one terminal whereby two sucessive current pulses are formed by successive line discharges through said one terminal.

6. A solid state pulse generator, including in combination, a plurality of delay lines each having capacitance for storing electrical energy, each of said lines having first, second, and third terminals, the second terminal of said delay lines being connected to a common terminal, the capacitance of each line discharging through the first and second terminals thereof, a plurality of saturable magnetic reactors each exhibiting rectangular hysteresis characteristics and each having winding means for switching its respective reactor between two magnetic states, the number of reactors being one less than the number of delay lines, each winding means being connected between the first and third terminals of two of said plurality of delay lines to form a series electrical circuit therewith, the connecting together of the second terminals of said delay lines providing a cascade arrangement of reactor-delay line combinations whereby a series path is provided by the delay line inductances and capacitances for charging the capacitance of each of said plurality of lines, the cascade arrangement having a delay line at each end thereof, the third terminal of the last delay line in the cascade arrangement being unconnected.

means for charging the capacitance of all of said plurality of delay lines such that all lines are simultaneously charged and for setting said reactors to a first magnetic state thereby providing a high impedance in the winding means opposing discharge of the capacitance of said plurality of delay lines, and single switch means for electrically coupling all of the series electrical circuits formed by said delay lines and said reactors to a load, the actuating of said switch means resulting in the successive switching of the individual reactors to the other magnetic state and the successive discharge of said individual delay lines whereby the discharge current supplied to the load constitutes a sequence of pulses, the pulses being formed at a rate exceeding the normal on-off switching capabilities of the single switch means.

7. A solid state pulse generator, including in combination, a plurality of delay lines each having capacitance for storing electrical energy, each of said lines having first and second terminals and forming the discharge path of the capacitance therethrough, the second terminals of said delay lines being coupled to a common terminal, a plurality of saturable magnetic reactors each exhibiting rectangular hysteresis characteristics and each having winding means for switching its respective reactor between two magnetic states, each winding means being connected to the first terminal of one of said plurality of delay lines to form a series of electrical circuit therewith, means for connecting said series circuits in electrical parallel, means for charging the capacitance of all of said plurality of delay lines such that all lines are simultaneously charged and for setting said reactors to a first magnetic state thereby providing a high impedance in the winding means opposing discharge of the capacitance of the corresponding delay line, and single switch means for simultaneously electrically coupling all of the series circuits in parallel to a load, each reactor having a different volt-second characteristic such that the respective lines discharge a current through their respective reactors at differing times upon the actuating of said switch means, the discharge current supplied to the load constituting a sequence of pulses, the pulses being formed at a rate exceeding the normal on-off switching capabilities of the single switch means.

8. A solid state pulse generator, including in combination, first and second delay lines each having capacitance for storing electrical energy, each of said lines having first and second terminals through which the capacitance may discharge stored electrical energy, said second line having a third terminal, a saturable reactor having a core exhibiting rectangular hysteresis characteristics and containing winding means for receiving current to switch the reactor core between two magnetic states, the third terminal of said second line being connected to said winding means, the first terminal of said first line being connected to said winding means whereby a current path between lines and through the reactor is provided, single switch means connected to the first terminal of said second delay line for selectively electrically coupling said delay lines to a load for the passage of discharge current thereto, said first delay line being electrically coupled to the load through the series formed by said reactor, said second line and said switch means, said reactor being operative to block discharge of said first line capacitance until after the second delay line has discharged through the switch means whereby the first line capacitance stored energy is supplied to the reactor for switching it between magnetic states to selectively provide a low impedance discharge path between the switch means from said first line.

References Cited

UNITED STATES PATENTS

| | | | |
|---|---|---|---|
| 2,710,351 | 6/1955 | Lebacgz | 328—67 |
| 2,758,221 | 8/1956 | Williams | 333—29 |
| 3,171,030 | 2/1965 | Foster et al. | 328—67 |
| 3,337,755 | 8/1967 | Grabowski et al. | 328—67 |

JOHN S. HEYMAN, Primary Examiner

B. P. DAVIS, Assistant Examiner

U.S. Cl. X.R.

307—252, 314; 328—67